(12) United States Patent
Beer et al.

(10) Patent No.: US 7,413,353 B2
(45) Date of Patent: Aug. 19, 2008

(54) DEVICE AND METHOD FOR DATA TRANSMISSION BETWEEN STRUCTURAL UNITS CONNECTED BY AN ARTICULATED JOINT

(75) Inventors: Gottfried Beer, Nittendorf (DE); Jochen Dangelmaier, Beratzhausen (DE); Cyrus Ghahremani, Regensburg (DE); Jean Schmitt, Zeitlarn (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 11/693,446

(22) Filed: Mar. 29, 2007

(65) Prior Publication Data
US 2007/0230876 A1 Oct. 4, 2007

(30) Foreign Application Priority Data
Mar. 29, 2006 (DE) .............. 10 2006 014 795

(51) Int. Cl.
*G02B 6/36* (2006.01)
*G02B 6/00* (2006.01)
(52) U.S. Cl. .................... 385/88; 385/92; 264/1.24; 264/1.25; 264/1.28
(58) Field of Classification Search ............. 385/24, 385/53, 52, 60, 76, 77, 78, 88, 89, 92, 93, 385/94, 139, 25; 264/1.24, 1.25, 1, 28
See application file for complete search history.

(56) References Cited

U.S. PATENT DOCUMENTS

| | | | |
|---|---|---|---|
| 5,325,455 A * | 6/1994 | Henson et al. ............. 385/89 |
| 5,522,002 A * | 5/1996 | Chun et al. .................... 385/88 |
| 5,625,732 A * | 4/1997 | Chun et al. .................... 385/88 |
| 6,356,741 B1 | 3/2002 | Bilotti et al. ................. 307/116 |
| 6,470,132 B1 | 10/2002 | Nousiainen et al. .......... 385/146 |
| 6,905,260 B2 | 6/2005 | Anderson et al. .............. 385/91 |
| 7,048,450 B2 | 5/2006 | Beer et al. ...................... 385/88 |
| 7,090,410 B2 * | 8/2006 | Kambe et al. .................. 385/88 |
| 2004/0223689 A1 | 11/2004 | Lempkowski et al. ......... 385/26 |
| 2006/0045435 A1 * | 3/2006 | Kambe et al. .................. 385/92 |
| 2006/0088256 A1 | 4/2006 | Dangelmaier et al. ......... 385/92 |
| 2007/0230876 A1 * | 10/2007 | Beer et al. ...................... 385/88 |

FOREIGN PATENT DOCUMENTS

DE 10023463 A1 12/2001 ............... 385/88 X

OTHER PUBLICATIONS

Hans-Georg Unger, "Optische Nachrichtentechnik," Berlin, Elitera-Verlag, 1976, p. 103-105, ISBN: 3-87087-072-9, with English translation of relevant passages.

* cited by examiner

*Primary Examiner*—Brian M Healy
(74) *Attorney, Agent, or Firm*—Edell, Shapiro & Finnan, LLC

(57) ABSTRACT

A device for transmitting data between two structural units connected to one another by an articulated joint has a long service life which permits a high transmission rate in conjunction with particularly small dimensions. The first structural unit includes a first optoelectronic component and the second structural unit includes a second optoelectronic component, the first optoelectronic component being connected to the second optoelectronic component via at least one optical fiber. One end of the optical fiber is brought into contact with the first optoelectronic component via a molded interconnect device (MID) plug connection and the other end is brought into contact with the second optoelectronic component via another MID plug connection.

31 Claims, 3 Drawing Sheets

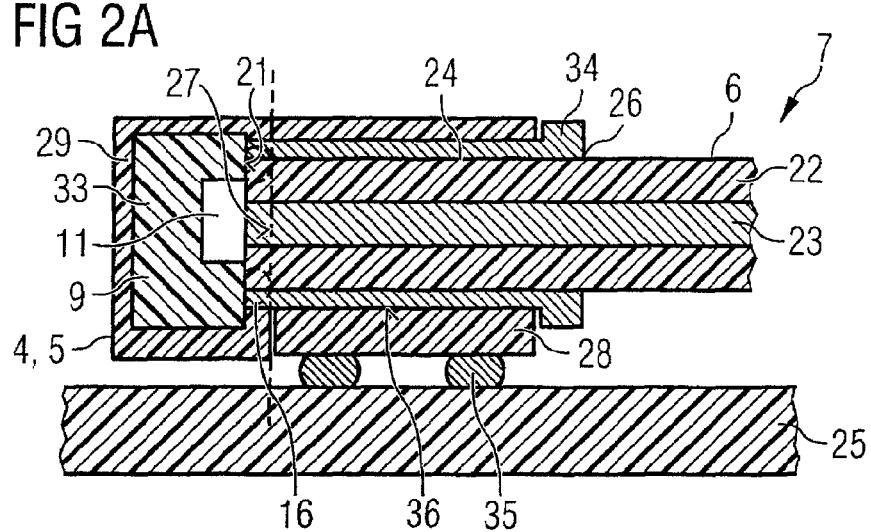
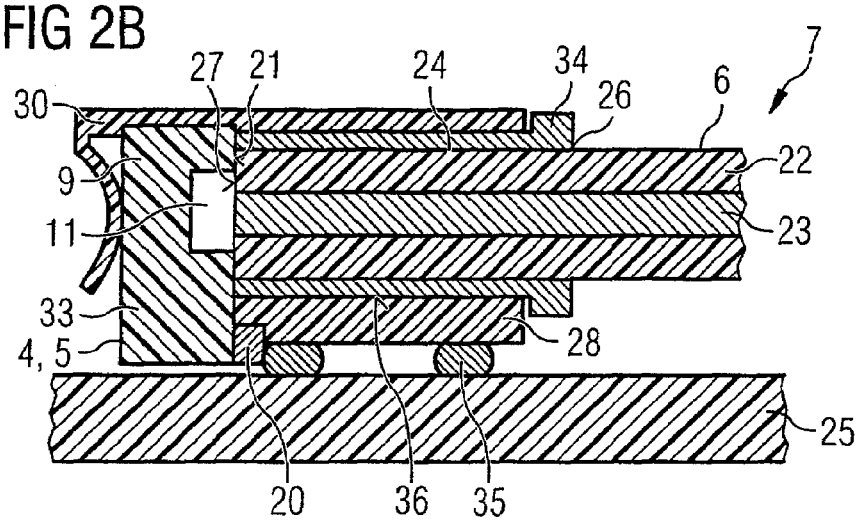
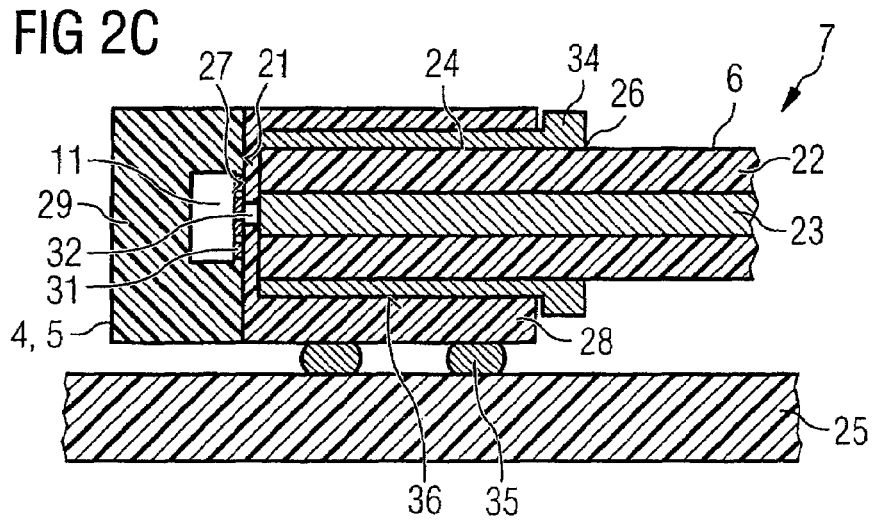

DEVICE AND METHOD FOR DATA TRANSMISSION BETWEEN STRUCTURAL UNITS CONNECTED BY AN ARTICULATED JOINT

CROSS REFERENCE TO RELATED APPLICATIONS

This application claims priority under 35 U.S.C. §119 to Application No. DE 102006014795.2 filed on Mar. 29, 2006, entitled "Device and Method for Data Transmission Between Structural Units Connected by an Articulated Joint," the entire contents of which are hereby incorporated by reference.

BACKGROUND

In electronic appliances such as mobile telephones or handheld computers (PDAs), it is necessary to ensure data transmission between a circuit board of the screen, which is mechanically connected to a base part via an articulated joint, and a circuit board assigned to the keypad/keyboard. This data transmission is typically effected electronically via ribbon cables and/or coaxial cables, but this entails the disadvantages of comparatively large dimensions, EMC problems and a considerable susceptibility to wear.

A known device makes use of the possibility of optical data transmission between two structural units connected to one another by an articulated joint. For this purpose, an optical articulated joint is provided, which comprises two structural units which are produced from a material suitable as optical waveguide and can be rotated relative to one another about an axis of rotation. The two structural units have mirror-coated surfaces in order to ensure the guidance of the light signal. Between the two structural units there is an air gap which the light signal has to cross.

One disadvantage of the known device is the complicated free radiating optical arrangement, which requires special materials for the two structural units, and also a precise and primarily also permanent alignment. Such a permanent exact alignment cannot be reliably ensured, however, in the case of a highly stressed object of practical use such as a mobile telephone, so that the device is not expected to exhibit an appreciably improved service life in comparison with devices having ribbon cables. Moreover, the known device has focusing problems or reflecting problems occurring at the entrance and exit of the light signal at the air gap. These problems can only be solved with considerable outlay and are therefore associated with disproportionate costs.

SUMMARY

A device, an arrangement and a method for transmitting data between two structural units connected to one another by an articulated joint are described herein. The device has a long service life permitting a high transmission rate in conjunction with particularly small dimensions. The first structural unit comprises a first optoelectronic component and the second structural unit comprises a second optoelectronic component. The optoelectronic components may be, for example, an optoelectronic transmitter and a receiver between which signals are intended to be transmitted (i.e., bi-directional signal processing). The first optoelectronic component is connected to the second optoelectronic component via at least one optical fiber. One end of the optical fiber is brought into contact with the first optoelectronic component via a molded interconnect device (MID) plug connection and the other end is brought into contact with the second optoelectronic component via another MID plug connection.

The above and still further features and advantages of the present invention will become apparent upon consideration of the following definitions, descriptions and descriptive figures of specific embodiments thereof, wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

Exemplary embodiments of the device, arrangement and method are explained in more detail below with reference to the accompanying figures, where:

FIG. 2a shows a side view of one embodiment of the plug connection according to the described device;

FIG. 2b shows a side view of an alternative embodiment of the plug connection;

FIG. 2c shows a side view of a further embodiment of the plug connection;

DETAILED DESCRIPTION

Figure 1:
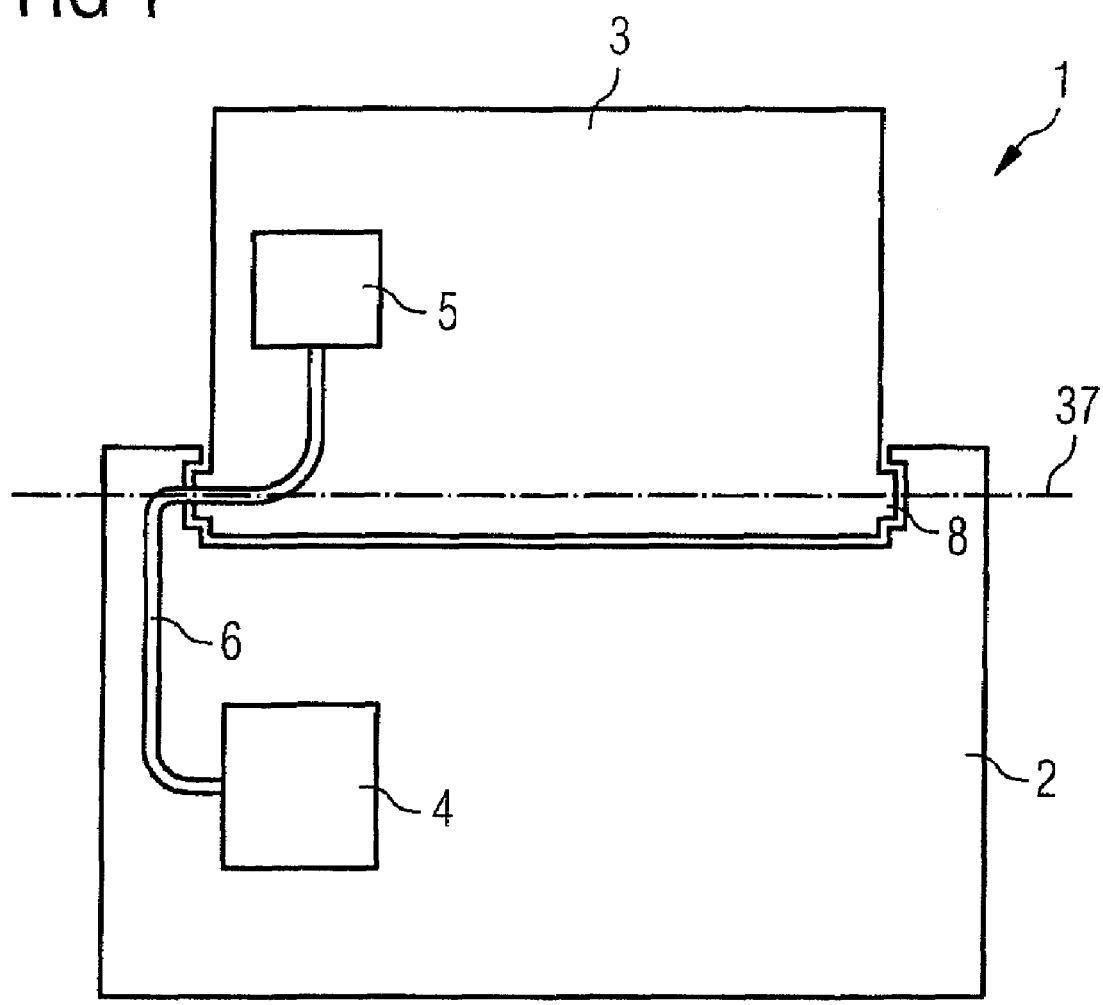
FIG. 1 schematically shows two structural units between which signals can be transmitted via an optical fiber.

Described herein is a device for data transmission between two structural units connected to one another via an articulated joint which has a long service life with acceptable production costs and in addition permits a high transmission rate in conjunction with particularly small device dimensions.

An optoelectronic transmitting and receiving arrangement comprises a circuit board and a first optoelectronic component that is arranged on the circuit board and is electrically connected thereto via solder connections, the first optoelectronic component including a molded interconnect device (MID) as carrier and being connected to at least one second optoelectronic component, which likewise includes a molded interconnect device (MID) as carrier, via at least one optical fiber. One end of the optical fiber is brought into contact with the first optoelectronic component via a plug connection integrated into the MID and the other end is brought into contact with the second optoelectronic component via a plug connection integrated into the further MID.

The described optoelectronic transmitting and receiving arrangement can be integrated into a device, e.g., an electronic appliance. Such a device comprises a first and a second structural unit, the structural units being connected to one another via an articulated joint and being movable relative to one another. The first structural unit comprises a first optoelectronic component and the second structural unit comprises a second optoelectronic component and the first optoelectronic component is connected to the second optoelectronic component via at least one optical fiber. One end of the optical fiber is brought into contact with the first optoelectronic component via a plug connection integrated into the MID and the other end is brought into contact with the second optoelectronic component via a plug connection integrated into the further MID.

The described device is based on the consideration that an optical fiber is particularly suitable for data transmission between the first and the second component because it is not as susceptible to wear as a complicated free radiating optical arrangement, which requires exact alignment. The use of an optical fiber with the MID component according to the described device and the optical plug connection additionally avoids focusing problems because it minimizes the free radiating lengths by virtue of its favorable geometrical arrangement. Consequently, the arrangement can also be used for fibers having large apertures, such as are customary in the case of POFs (plastic optical fibers), for example. A large aperture is desirable because it permits small bending radii of the fiber and, consequently, particularly small articulated joints without a large amount of light being lost during the transmission. Signals can thus be transmitted in a particularly simple manner via a continuous fiber.

In this case, an articulated joint is understood to be a movable connection between two or more bodies, so that both a ball-and-socket joint with three degrees of freedom and a hinge-like rotary joint or a sliding joint each with one degree of freedom or combinations thereof such as, e.g., rotary/sliding joints are conceivable.

An optical fiber can be integrated into an articulated joint particularly easily by providing a cavity in the interior of the joint, a fiber being led through the cavity. The deformation of the fiber upon movement of the articulated joint is optionally distributed between one or more bendings and/or torsions in order that the relative deformation is kept as small as possible. Furthermore, optionally thin fiber bundles are used since these are more flexible than an individual fiber having a relatively thick core.

It is advantageous for a transmitter such as, for example, a Vertical Cavity Surface-Emitting Laser (VCSEL) diode or even a plurality of redundant VCSEL diodes to be provided as first optoelectronic component and for a receiver such as, for example, a photodiode to be provided as second optoelectronic component. If a plurality, for example three, of redundant VCSEL diodes are provided, then a cost-and time-intensive burn-in test which only ensures the reliability of a VCSEL diode can be obviated. A monitor diode then ascertains, if appropriate, the failure of one of the redundant VCSEL diodes and a driver changes over to a functional one. An inexpensive and at the same time reliable optoelectronic component can be provided in this way. The mounting of a driver into the transmitter or of an amplifier into the receiver increases the packing density and also the electromagnetic compatibility.

The optical fiber used, for example, a polymer optical fiber (POF), should have a diameter of at most half a millimeter and a comparatively large numerical aperture of more than 0.4, for example, in order to enable the smallest possible bending radii and at the same time a long service life. This makes it possible to prevent the signal from being coupled out in an undesirable manner when the fiber is subject to a high degree of bending. Instead of an individual fiber, it is also possible to use a fiber bundle which is mounted into a ferrule at its ends.

A thin fiber entails a small exit and entrance diameter at the fiber ends, which means the disadvantage of increased difficultly in coupling in (i.e., "hitting" the fiber end) on the transmitter side, yet the advantage of precisely targeted coupling out of the light signal on the receiver side.

Owing to the use of a fiber bundle instead of an individual fiber, the coupling-in of the signal on the transmitter side is facilitated; however, the focusing of the light onto the receiver area is made more difficult, especially as the emerging light cone expands very rapidly at the high numerical aperture desired, with the result that a compromise must be found.

The molded interconnect device (MID) plug connection advantageously includes a channel with an end side and an entry side opposite the end side, the entry side including a receptacle for an optical fiber mounted into a ferrule or a fiber bundle-submodule with a semiconductor chip. The submodule is arranged on the side as first or second optoelectronic component in such a way that the active side of the semiconductor chip is directed into the channel.

In the case of this plug connection it is possible to obtain very small distances between the fiber and the optoelectronic components. Such small distances are desirable because, given the comparatively large aperture of the fiber, the problem otherwise arises of irradiating the receiver area with the light exit cone with a sufficient luminous efficiency. This problem would have to be compensated for via a complicated optical arrangement or via a large receiver area. Small distances between the fiber end and transmitter or receiver additionally have the advantage that the remaining interspace can be sealed in a simple manner and/or be provided with a matching liquid for matching the refractive indices, with the result that, even in the event of extreme temperature changes, a build-up of moisture on the fiber ends is avoided or is negligible owing to the small distance. In an advantageous manner, for the distances $d_1$ and $d_2$ between the respective fiber ends and the first and the second optoelectronic component, $0 \leq d_1 \leq 50$ µm and $0 \leq d_2 \leq 50$ µm, respectively, hold true.

The submodule with the semiconductor chip may be connected to the end side via a soldering connection, or the MID, for its part, is likewise connected to a circuit board via a soldering connection, the soldering connection lying below the channel receiving the fiber mounted into a ferrule.

A mobile telephone according to the invention comprises a base part and a cover, the cover being connected to the base part by an articulated joint. The base part includes a circuit board with a first optoelectronic component and the cover includes a circuit board with a second optoelectronic component, the first optoelectronic component being connected to the second optoelectronic component via at least one optical fiber. One end of the fiber is brought into contact with the first optoelectronic component via a molded interconnect device (MID) plug connection and the other end is brought into contact with the second optoelectronic component via a molded interconnect device (MID) plug connection.

In the case of such a mobile telephone, signals can be transmitted from a circuit board assigned to the keypad to the display via the optical fiber, for example.

The device according to the invention has the advantage that the optical fiber enables a particularly long-lived connection with high transmission rates in conjunction with extremely low EMC sensitivity. The use of a VCSEL diode enables transmission rates in the Gb/s range in conjunction with low power consumption, so that use in battery-operated mobile telephones is also possible without any problems. A further advantage, which is particularly important for the application in mobile telephones and PDAs, is that the described device can be made very small and hence in space-saving fashion.

A method for the transmission of data between structural units connected to one another by an articulated joint is described herein. The method comprises: first, an optical signal is generated by a first optoelectronic component, for example, a VCSEL diode, assigned to a first structural unit. The optical signal is coupled into an optical fiber or a fiber bundle, a molded interconnect device plug connection being provided at the coupling-in location. The optical signal is transmitted through the fiber to a coupling-out location, the entire transmission path from the coupling-in location to the coupling-out location having a constant refractive index and so the fiber being continuous and being led through the articulated joint. The optical signal is coupled out at the coupling-out location, a further molded interconnect device plug connection being provided at the coupling-out location. The signal is received by a second optoelectronic component, for example, a photodiode, comprised in a second structural unit.

In the following paragraphs, exemplary embodiments of the arrangement, device and method are described in connection with the figures.

In a device 1 according an exemplary embodiment of the invention comprising a first structural unit 2 and a second structural unit 3, the intention is to ensure a data transmission between the two structural units which is easy to mount, fast, as insensitive as possible to EMC and exhibits little susceptibility to wear. The first structural unit 2 is connected to the second structural unit 3 by an articulated joint 8, the articulated joint 8 typically being a hinge-like rotary joint, so that the components can be rotated relative to one another about an axis 37. However, ball-and-socket joints or sliding joints are also conceivable. For data transmission, an optical fiber 6 is arranged between the structural units and connects a first optoelectronic component 4 to a second optoelectronic component 5. The fiber 6 is mounted into a ferrule in this exemplary embodiment.

For this purpose, the fiber 6 can be led through a cavity (not specifically illustrated) within the articulated joint 8. It is connected to the first and the second optoelectronic component (4, 5) via plug connections 7, the plug connections 7 in each case being formed by a molded interconnect device (MID). The MID provides a three-dimensional receptacle and wiring structure that makes it possible to produce a conclusive and stable optical connection between the fiber 6 and the optoelectronic components (4, 5). Details of the plug connection 7 are shown in the subsequent figures.

The plug connection 7 in accordance with FIG. 2a comprises a channel 24 including an entry side 26 and a receptacle 28 for a fiber 6 with a core 23 and a cladding 22, the fiber being mounted into a ferrule 34. The plug connection 7 further comprises a submodule 33 soldered onto an end side surface 27 of the receptacle 28 with the aid of the solder balls 16 represented in dashed fashion. Spring strips (not illustrated) can be integrated into the receptacle 28, and press the ferrule 34 into a reference stop 36 in order to prevent withdrawal of ferrule 34 with fiber 6 from the receptacle 28. The optoelectronic component surrounded with a plastic housing 9, that is to say typically the semiconductor chip or chips 11 of the transmitter and/or of the receiver, is accommodated in the submodule 33. The entire MID plug connection 7 is mounted on a superordinate circuit board 25 via circuit board contacts 35 (e.g., solder balls). In this case, the soldering connections lie below the receptacle 28. The circuit board 25 is part of the first and second structural unit (2, 3). The fiber 6 with the ends mounted into ferrules 34 in this exemplary embodiment is inserted into the receptacle 28 after the mounting of the circuit board 25 into the structural units (2, 3) with articulated joint 8.

The solder balls 16 provided for soldering onto the surface 21 of the submodule 33 are fitted as accurately as possible with respect to the optical areas of the relevant semiconductor chips 11 in order to obtain a self-centering effect of the submodule 33. When the submodule 33 is soldered onto the soldering pads of the end side surface 27, which are in turn positioned as accurately as possible with respect to the receptacle 28, the self-centering effect results in good centering of the submodule relative to the receptacle 28 and hence to the channel 24 or to the fiber core 23. However, the centering may also be improved by a passive alignment via pattern recognition in conjunction with adhesive bonding. The MID may be equipped with further passive and/or active components (not specifically illustrated) and thus constitute an intelligent module. The submodule 33 may be additionally fixed via underfill material (not illustrated), so that no displacements whatsoever are possible during the later soldering of the MID onto the circuit board 25, during which the solder connection to the end side surface 27 is initially liquefied again.

After soldering onto the end side surface 27, the submodule 33 can be protected with a protective enclosure 29, which may already be integrated into the MID, and be subjected to both electrical and optical functional tests. The MID plug connection 7, completed in this way, can then be packaged, stored, transported and soldered onto the circuit board 25 as optoelectronic component with integrated plug connection like a surface-mountable standard component via soldering connections 35. The electrical contact-connection of the optoelectronic component to the circuit board 25 is realized via the soldering connections (16, 35).

After the mounting of the MID plug connection 7, the fiber mounted into the ferrule 34 or the fiber bundle 6 can be inserted into the receptacle 28 and be pushed towards the submodule 33 as far as the stop. A minimum distance between the fiber and the surface 21 of the submodule 33 is possible in this way, which ensures a particularly good and uncomplicated coupling-in of the signal primarily on the receiver side.

In an alternative embodiment in accordance with FIG. 2b, the submodule 33 is fixed to the end side surface 27 of the receptacle 28 via one or more spring elements 30 rather than via solder balls. In addition, it is also possible to provide lateral spring elements which exert a force on the submodule 33 perpendicular to the plane of the drawing and press it against a lateral boundary surface (not illustrated). The boundary surfaces and also the spring elements 33 are part of the MID. Moreover, additional adhesive bonding connections between the submodule 33 and the end side surface 27 are conceivable. The electrical connection between the submodule 33 and the circuit board 25 is realized by solder pads 20 of the submodule which are connected to the circuit board contacts 35 when the MID plug connection 7 is soldered onto the circuit board 25. In this case, simple solderable metal areas, for example "lands", which are brought into contact with solder deposits on the circuit board 25 during soldering, may also be used as circuit board contacts 35 of the MID plug connection 7. The conductor tracks of the MID itself can be produced via an injection-molded leadframe or by other conventional methods since, in the case of this construction, no soldering pads or conductor track structures are provided on the end side surface 27.

FIG. 2c shows a further embodiment of the MID plug connection 7. In FIG. 2c, the semiconductor chip 11 is soldered directly onto the end side surface 27 via flip-chip contacts 31 using "bare die technology". In this case, the end side 27 includes a fine injection-molding skin (not illustrated in detail) with an optical through contact 32, for instance a hole or window, the diameter of the optical through contact 32 being at least as large as the optically active area of the semiconductor chip 11. Conductor tracks on the injection-molding skin which connect contact pads of the semiconductor chip 11 to the circuit board contacts 35 have to be very finely structured in this exemplary embodiment. The semiconductor chip or chips 11 may be provided with a layer comprising, if appropriate, transparent underfill material and may also include wire bonding contacts in addition to the flip-chip contacts.

Details of various embodiments of the submodule are shown in the subsequent figures.

Figure 3A:
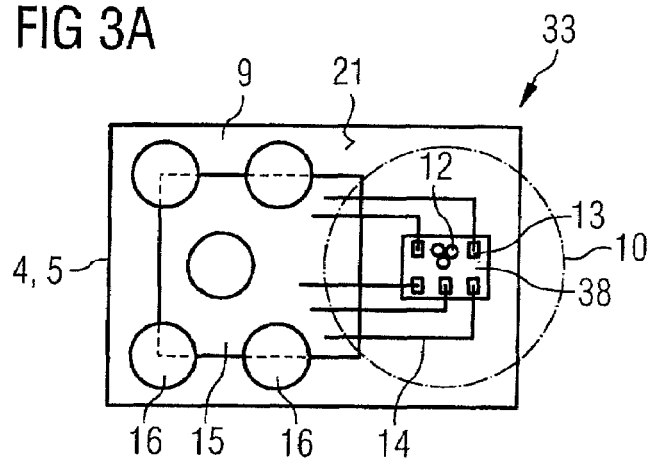
FIG. 3a schematically shows a front view of a submodule of the plug connection in accordance with a first embodiment.

FIG. 3a shows the submodule 33 with the optically active transmitter or receiver component 38, which includes, for example, redundant VCSEL diodes 12 or a photodiode, its contact areas 13 being connected via conductor tracks 14 to a driver or amplifier chip 15 and/or to solder balls 16.

FIG. 3a therefore shows a front view of a submodule 33, the surface 21, after mounting, pointing into the channel and lying perpendicular to the longitudinal direction of the fiber 6 or the ferrule 34, the contour 10 of which is indicated by the dashed line. If the submodule 33 is an optoelectronic transmitter module, then it typically has an electro-optical transducer such as, e.g., the VCSEL diodes illustrated here, the contrast areas 13 of which are connected to a driver chip 15 via the conductor tracks 14. By contrast, if the submodule 33 is an optoelectronic receiver module, then it includes an optoelectronic transducer and its contact areas 13 are connected to an amplifier or signal processing chip 15 via the conductor tracks 14. The short lines on the transmitter side between driver (with logic for redundancy circuit) and VCSEL diode minimize the electromagnetic emission. The short lines—produced via a thin-film technique that is not specifically illustrated here—between transmitter and amplifier minimize the sensitivity towards electromagnetic interference, since the signals of the receiver are amplified after an extremely short path.

On its surface 21, the submodule 33 comprises a number of solder balls 16 which can electrically and/or mechanically connect the submodule 33 to the end side (not illustrated in this figure).

In accordance with a further embodiment (not illustrated), the submodule comprises only a transmitter or receiver component whose contact areas are connected to soldering pads or solder balls via conductor tracks. Further components such as, for example, driver, amplifier and passive components can be mounted separately onto the MID or be mounted onto the circuit board while accepting longer conductor tracks and the disadvantages thereof.

Figure 3B:
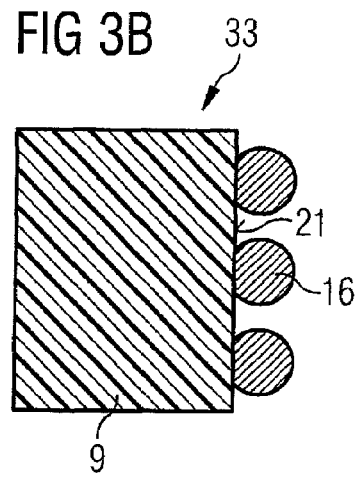
FIG. 3b shows a side view of the embodiment.
Figure 4A:
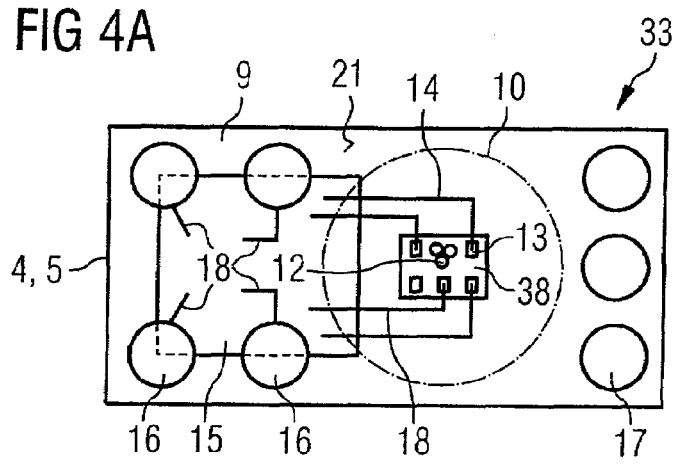
FIG. 4a schematically shows a front view of a submodule of the plug connection in accordance with a second embodiment.
Figure 4B:
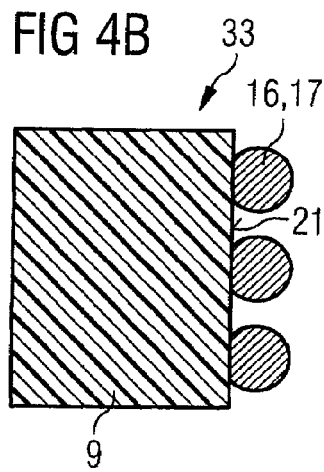
FIG. 4b shows a side view of the second embodiment.
Figure 5A:
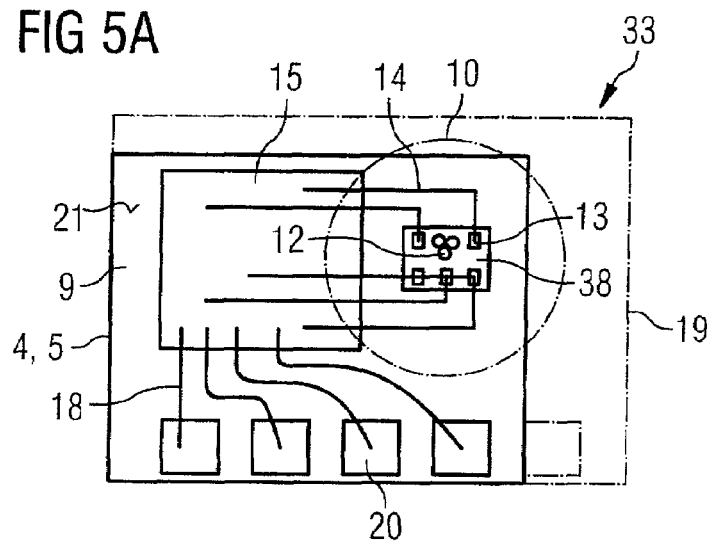
FIG. 5a schematically shows a front view of a submodule of the plug connection in accordance with a third embodiment.
Figure 5B:
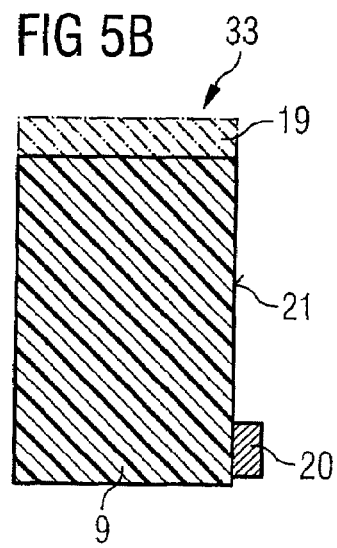
FIG. 5b shows a side view of the third embodiment.

FIGS. 3b, 4b and 5b show side views of the submodules 33 with the plastic housing 9 and solder balls 16 and/or further solder balls 17 arranged on the surface 21. The submodule in accordance with FIG. 5b may additionally have an extension 19 and solder pads 20 or "lands" instead of solder balls on its surface 21.

The front view of the submodule 33 in accordance with a second embodiment is shown in FIG. 4a. For reasons of symmetry, this submodule 33 is somewhat wider than the submodule 33 in accordance with FIG. 3a and has further solder balls 17, which facilitate a self-centering of the submodule 33 and additionally stabilize the submodule 33 during the insertion of the fiber. In addition, provision is made of further conductor tracks 18 for connecting contact areas (not illustrated) of the driver or amplifier chip 15 to the solder balls 16 and, if appropriate, also to the further solder balls 17, thereby enabling a "more generous" rewiring. A rewiring layer (not specifically illustrated) embodied using thin-film technology is provided for this purpose. Submodules 33 in accordance with the first or second embodiment can be applied to the end side 27 of the MID plug connection 7 as illustrated in FIG. 2a.

FIG. 5a shows a front view of the submodule 33 in accordance with a third embodiment. The submodule 33 has no solder balls 16 or further solder balls 17, but instead includes solder pads 20 which are connected via further conductor tracks 18 to the driver or amplifier chip 15 or directly to the electro-optical or optoelectronic transducers. An extension 19, indicated by the broken line, may be provided for stabilizing the submodule 33 during the insertion of the fiber. A submodule 33 in accordance with this third embodiment can be applied to the end side 27 of the MID plug connection 7 as illustrated in FIG. 2b.

While the invention has been described in detail with reference to specific embodiments thereof, it will be apparent to one of ordinary skill in the art that various changes and modifications can be made therein without departing from the spirit and scope thereof. Accordingly, it is intended that the present invention covers the modifications and variations of this invention provided they come within the scope of the appended claims and their equivalents.

What is claimed is:

1. An optoelectronic transmitting and receiving arrangement, comprising:
   first and second optoelectronic components;
   at least one optical fiber having first and second ends;
   a first molded interconnect device (MID) plug connection arranged on and electrically connected to a first structural unit, the first MID plug connection coupling the first optoelectronic component to the first end of the at least one optical fiber;
   a second MID plug connection arranged on and electrically connected to a second structural unit, the second MID plug connection coupling the second optoelectronic component to the second end of the at least one optical fiber, thereby optically coupling the first optoelectronic component to the second optoelectronic component; and
   an articulated joint connecting the first and second structural units to one another such that the first and second structural units are movable relative to one another.

2. The optoelectronic transmitting and receiving anangement according to claim 1, wherein the first optoelectronic component comprises a transmitter and the second optoelectronic component comprises a receiver.

3. The optoelectronic transmitting and receiving arrangement according to claim 1, wherein the distance between the first optoelectronic component and the first end of the at least one optical fiber and the distance between the second optoelectronic component and the second end of the at least one optical fiber are in the range between 0 µm and 50 µm, inclusive.

4. The optoelectronic transmitting and receiving arrangement according to claim 1, wherein the at least one optical fiber has a numerical aperture NA, where: $0.4 \leq NA$.

5. The optoelectronic transmitting and receiving arrangement according to claim 1, wherein the at least one optical fiber comprises a polymer optical fiber.

6. The optoelectronic transmitting and receiving arrangement according to claim 1, further comprising:
   a fiber bundle including the at least one optical fiber.

7. The optoelectronic transmitting and receiving arrangement according to claim 1, wherein the at least one optical fiber has a diameter d, where: $d \leq 0.5$ mm.

8. The optoelectronic transmitting and receiving arrangement according to claim 1, wherein the at least one optical fiber has a diameter d, where: $d \geq 0.5$ mm.

9. The optoelectronic transmitting and receiving arrangement according to claim 1, wherein the at least one optical fiber has a diameter d, where: d≧1 mm.

10. The optoelectronic transmitting and receiving arrangement according to claim 1, further comprising first and second ferrules, wherein the first end of the at least one optical fiber is mounted into the first ferrule and the second end of the at least one fiber is mounted into the second ferrule.

11. The optoelectronic transmitting and receiving arrangement according to claim 1, wherein the first optoelectronic component comprises a Vertical Cavity Surface-Emitting Laser (VCSEL) diode.

12. The optoelectronic transmitting and receiving anangement according to claim 11, wherein the first optoelectronic component includes a plurality of redundant VCSEL diodes.

13. The optoelectronic transmitting and receiving arrangement according to claim 1, wherein the second optoelectronic component comprises a photodiode.

14. The optoelectronic transmitting and receiving arrangement according to claim 1, wherein each of the first and second MID plug connections comprises:
a receptacle for receiving a respective end of the at least one optical fiber; and
a submodule arranged on an end side surface of the receptacle, the submodule housing a respective one of the first and second optoelectronic components such that an active side of the respective optoelectronic component is directed into the receptacle.

15. The optoelectronic transmitting and receiving arrangement according to claim 14, wherein the submodule is connected to the end side surface via a soldering connection.

16. The optoelectronic transmitting and receiving arrangement according to claim 14, each of the first and second MID plug connections comprises:
a matching liquid for refractive index matching disposed between the respective end of the at least one optical fiber and a surface of the submodule.

17. The optoelectronic transmitting and receiving arrangement according to claim 14, wherein the first MID plug connection is connected to the first structural unit via a soldering connection lying at least partly below the receptacle.

18. The optoelectronic transmitting and receiving arrangement according to claim 1, wherein the articulated joint comprises a rotary joint.

19. The optoelectronic transmitting and receiving arrangement according to claim 1, wherein the articulated joint comprises a sliding joint.

20. The optoelectronic transmitting and receiving arrangement according to claim 1, wherein the articulated joint comprises an interior cavity for receiving the at least one optical fiber.

21. A mobile telephone, comprising:
the optoelectronic transmitting and receiving arrangement according to claim 1;
a base part comprising the first structural unit; and
a cover comprising the second structural unit.

22. A method for transmitting data between structural units connected to one another by an articulated joint, the method comprising:
generating an optical signal via a first optoelectronic component of a first structural unit;
coupling the optical signal at a coupling-in location into at least one optical fiber via a molded interconnect device (MID) plug connection;
transmitting the optical signal via the fiber extending through the articulated joint along a transmission path from the coupling-in location to a coupling-out location, the entire transmission path having a constant refractive index;
coupling out of the optical signal at the coupling-out location via a further molded interconnection device plug connection; and
receiving the optical signal via a second optoelectronic component of a second structural unit, wherein the first and second structural units are connected to one another by an articulated joint such that the first and second structural units are movable relative to one another.

23. A molded interconnect device (MID) substrate operable as a plug connection for coupling an optoelectronic semiconductor component to an optical fiber, the MID substrate comprising:
an end side surface for mounting a semiconductor chip;
at least one receptacle for receiving the optical fiber such that the distance between an end of the optical fiber and an optical surface of the semiconductor chip is less than 100 μm; and
electrical contacts for soldering to a superordinate circuit board disposed at least partly below the receptacle.

24. The MID substrate according to claim 23, wherein the semiconductor chip is housed in a submodule and the end side surface of the MID substrate is configured to permit mounting of the submodule thereon.

25. The MID substrate according to claim 24, wherein the submodule is connected to the MID substrate via solder connections comprising solder balls or solder lands.

26. The MID substrate according to claim 24, further comprising a spring element injection-molded onto the MID substrate, wherein the spring element presses the submodule against the end side surface.

27. The MID substrate according to claim 24, wherein the submodule is fixed to the MID substrate via an adhesive.

28. The MID substrate to claim 23, wherein the MID substrate does not have conductor tracks on the end side surface.

29. The MID substrate according to claim 23, further comprising:
a thin injection-molded skin with an optical through contact; and
fine conductor tracks on the end side surface, wherein the semiconductor chip is mounted onto the end side surface via flip-chip technology.

30. The MID substrate according to claim 23, wherein the receptacle further comprises spring strips for pressing an inserted optical fiber against a reference surface or for preventing withdrawal of the fiber in a self-locking manner.

31. The MID substrate according to claim 30, wherein the spring strips are configured such that self-locking is releasable via a tool or exertion of pressure.

* * * * *